United States Patent [19]
Robinson

[11] Patent Number: 5,813,893
[45] Date of Patent: Sep. 29, 1998

[54] FIELD EMISSION DISPLAY FABRICATION METHOD

[75] Inventor: Richard K. Robinson, Weston, Tex.

[73] Assignee: SGS-Thomson Microelectronics, Inc., Carrollton, Tex.

[21] Appl. No.: 581,046

[22] Filed: Dec. 29, 1995

[51] Int. Cl.⁶ ........................................... H01J 9/26
[52] U.S. Cl. .............................. 445/25; 445/43; 445/44; 65/54
[58] Field of Search ................ 445/25, 43, 44; 65/54

[56] References Cited

U.S. PATENT DOCUMENTS

| | | | |
|---|---|---|---|
| 3,367,760 | 2/1968 | Bendig et al. | 65/54 |
| 4,407,658 | 10/1983 | Bernot et al. | 445/25 |
| 4,654,106 | 3/1987 | Davis et al. | 156/345 |
| 4,657,617 | 4/1987 | Johnson et al. | 156/345 |
| 4,657,618 | 4/1987 | Spencer et al. | 156/345 |
| 4,657,620 | 4/1987 | Davis et al. | 156/345 |
| 4,659,413 | 4/1987 | Davis et al. | 156/345 |
| 4,891,087 | 1/1990 | Davis et al. | 156/345 |
| 5,157,304 | 10/1992 | Kane et al. | 313/495 |
| 5,186,670 | 2/1993 | Doan et al. | 445/24 |
| 5,205,770 | 4/1993 | Lowrey et al. | 445/24 |
| 5,232,549 | 8/1993 | Cathey et al. | 456/633 |
| 5,259,799 | 11/1993 | Doan et al. | 445/24 |
| 5,302,238 | 4/1994 | Roe et al. | 156/643 |
| 5,329,207 | 7/1994 | Cathey et al. | 315/169.1 |
| 5,342,477 | 8/1994 | Cathey | 156/643 |
| 5,374,868 | 12/1994 | Tjaden et al. | 313/310 |
| 5,448,131 | 9/1995 | Taylor et al. | 313/309 |
| 5,449,970 | 9/1995 | Kumar et al. | 313/495 |
| 5,547,483 | 8/1996 | Garcia et al. | 65/54 |

FOREIGN PATENT DOCUMENTS

| | | |
|---|---|---|
| 0 732 723 A1 | 9/1994 | European Pat. Off. . |
| WO 94/15244 | 7/1994 | France . |
| 2704672 | 9/1994 | France . |
| 2705163 | 11/1994 | France . |
| WO94/15244 | 7/1994 | WIPO . |

OTHER PUBLICATIONS

Philip P. Damon, "Glass Frit Spacing of Vacuum Tube Elements," *RCA Technical Notes,* RCA TN No. 195.

Iscoff, Ron, ed. "Will Diamond Shine for ICs?", *Semiconductor International,* Dec. 1993, pp. 48–50, 52.

Werner, Ken, ed. "U.S. Display Industry on the Edge", *IEEE Spectrum,* May 1995, pp. 62–69.

Kumar, Nalin, et al., "Diamond–Based Field Emission Flat Panel Displays", *Solid State Technology,* May 1995, pp. 71–72, 74.

Lreberman, David, "FEDs are Coming to Town", *OEM Magazine,* Apr. 1995, pp. 44–49, 51.

Derbyshire, Katherine, "Beyond AMLCDs: Field Emission Displays?", *Solid State Technology,* Nov. 1994, pp. 55, 56, 58, 60–62, 65.

Lieberman, David, "FED Proposals Find Cool Receiption at SID", *Electronic Engineering Times,* Jun. 20, 1994.

Lieberman, David, "Startup Claims Lead in FED Production", *Electronic Engineering Times,* Jul. 4, 1994.

Dawson, Fred. "The State of the Display: Flat–Panel Screens Coming Soon to a PDA or Computer Near You", *Digital Media,* Feb./Mar. 1994, pp. 10–14.

(List continued on next page.)

*Primary Examiner*—P. Austin Bradley
*Assistant Examiner*—Jeffrey T. Knapp
*Attorney, Agent, or Firm*—Richard A. Bachand; Theodore E. Galanthay; Lisa K. Jorgenson

[57] ABSTRACT

A method for fabricating a field emission display and the resulting display device are disclosed. The method includes the steps of arranging a sealing layer between a face plate and a substrate, heating the sealing layer until the substrate layer adheres to the face plate, and then pulling the face plate away from the substrate so that the vacuum is improved. The sealing layer may be constructed from glass and heated with a heating coil made from Ni-chrome wire. The elements can be positioned using industrial robots using common manufacturing techniques.

29 Claims, 5 Drawing Sheets

OTHER PUBLICATIONS

"B. Cold Cathode Field Emission Displays", *Competitive Display Technologies,* 1993 Stanford Resources, Inc., pp. 104–109.

Jiang, J.C. and R.C. White, "Electron Emission from Silicon Tips Coated with a Very Thin Cr Film", *SID 93 Digest,* pp. 596–598.

Kasling, W.D. and Hunt, C.E., "Field–Emission Display Resolution", *SID 93 Digest,* pp. 599–602.

Levy, F. and R. Meyer, "Phosphors for Full–Color Microtips Fluorescent Displays", *IEEE,* 1991, pp. 20–23.

FIELD EMISSION DISPLAY FABRICATION METHOD

BACKGROUND OF THE INVENTION

1. Field of the Invention

This invention relates to Field Emission Displays (FEDs) and the methods for fabricating FEDs and more specifically to methods for attaching a face plate to the substrate of an FED and to FED structures constructed thereby.

2. Description of the Relevant Art

The problem addressed by this invention is encountered in the manufacturing of Field Emission Displays (FEDs). FEDs operate on the principle of cathodoluminescent phosphors excited by cold cathode field emission electrons in a structure as shown from a sectional view in FIGS. 1 and a perspective view in FIG. 2. A face plate 2 or anode having a cathodoluminescent phosphor coating similar to that of a cathode ray tube receives patterned electron bombardment which can be seen by a viewer. The face plate 2 is separated from the base plate (substrate 6) or cathode by a gap containing a vacuum of $10^{-9}$ Torr to $10^{-6}$ Torr, and outside atmospheric pressure is prevented from collapsing the two plates together either by the tensile strength of each of the two plates or by spacers which are not shown in this figure. Arrays of electron emission sites (emitters 7) are typically cone shaped that produce electron emission in the presence of an intense electric field.

Figure 1:
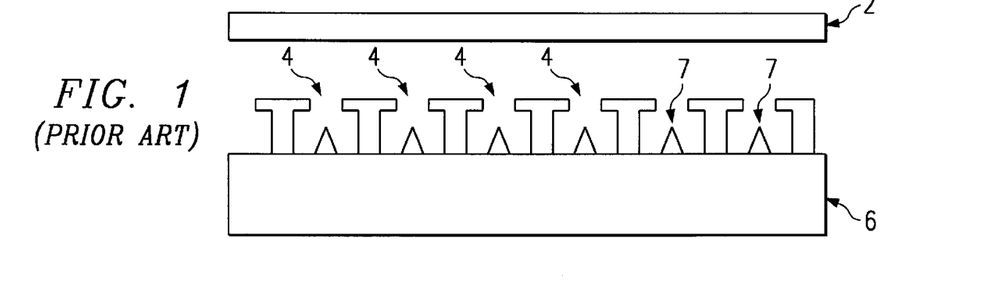
FIG. 1 is a simplified sectional view of a field emission display as is known in the prior art.
Figure 2:
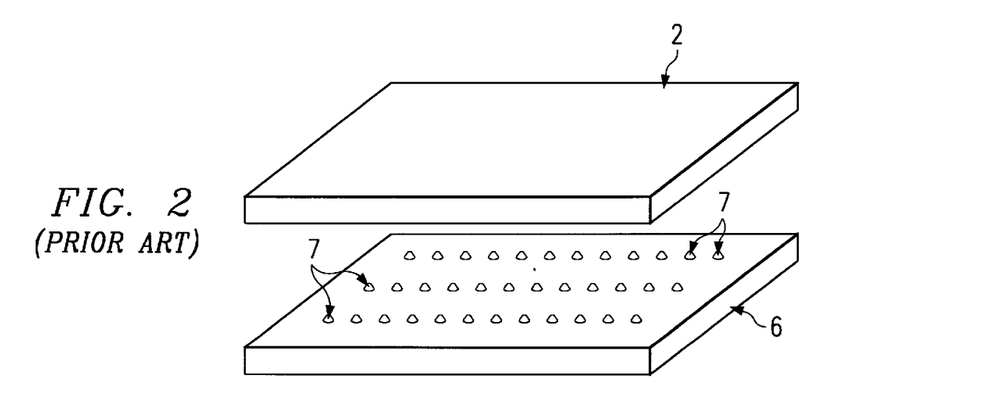
FIG. 2 is a perspective view of a field emission display as is known in the prior art.

In the case of FIG. 1, and most field emission displays, a grid voltage is applied to gates to control the flow of electrons from a particular set of emitters. There is a field of several hundred volts even up to one thousand between the cold cathode emitters and anode. The emission process is thoroughly discussed in the literature, and one useful explanation of it as directly applied to vacuum microelectronics can be found in Spindt et al., "Physical Properties of Thin Film Field Emission Cathodes with Molybdenum Cones," 47 J. APPLIED PHYSICS 5248 (1976), which is hereby incorporated by reference.

The substrate of an FED includes arrays of emission sites, and connections for addressing and activating the generation of electron beams from those sites. Many techniques are available for creating the emissions from arrays, addressing the emissions arrays, and activating the emissions sites. These techniques are discussed in the Spindt et al. paper above and in many U.S. patents, such as U.S. Pat. Nos. 5,302,207 and 5,329,207, which are hereby incorporated by reference.

It is known that FEDs might be used to display images similar to the images displayed on CRT's. It is also known that to display an image using an FED, the volume inside the FED has to be evacuated to permit emitted electrons to freely travel through the volume within the FED and impinge upon the face plate. Therefore, the enclosure for the FED should permit the FED to be sealed in an evacuated volume at a high vacuum level.

Therefore, it is a primary object of the invention to provide a method for attaching a face plate to a substrate of a field emission display while increasing the high vacuum between the anode and the cathode.

It is another object of the invention to provide a method for fabricating a field emission display which has an increased vacuum compared with the vacuum chamber where it is assembled.

It is yet another object of the invention to provide an improved fabrication method for making field emission displays.

These and other objects, features, and advantages of the invention will be apparent to those skilled in the art from the following detailed description of the invention, when read with the drawings and appended claims.

SUMMARY OF THE INVENTION

The invention can be summarized as a field emission display and a method and machine for fabricating field emission displays. The method includes the steps of arranging a seal ring between a face plate and a substrate, heating the seal ring until the seal ring adheres to the face plate and the substrate, and then applying a separating tension to the face plate and the substrate creating a further separation and decreasing the width of the seal ring and increasing the length such that the vacuum is improved. The seal ring may be constructed from glass and heated with a heating coil made from ni-chrome wire. The elements can be positioned using robotic technology.

BRIEF DESCRIPTION OF THE DRAWING

FIGS. 8a–c shows perspective views of an FED manufactured by the disclosed invention.

DETAILED DESCRIPTION OF AN EMBODIMENT OF THE INVENTION

Figure 3:
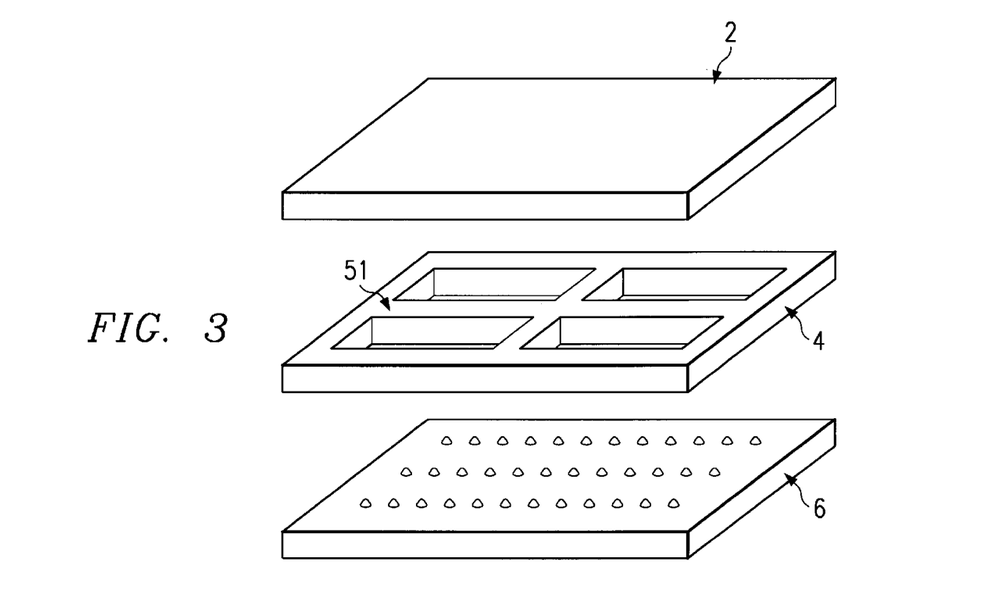
FIG. 3 is a perspective view of a field emission display and an embodiment of the sealing layer.

A method of fabricating a field emission display according to an embodiment of the invention will be described. FIG. 3 shows that a seal ring 4 is placed between a face plate 2 and a substrate 6. It will be understood by persons skilled in the art that the face plate 2 is the element containing phosphorus which emits light when struck by electrons. It is also understood that the substrate comprises the emitters and the extraction gates, even though they are not shown. The seal ring 4 is shaped such that it will match up with the borders of the face plate and substrate. It will be appreciated that the seal ring 4 can take any form, such as circular or rectangular, as long as the seal ring 4 matches the shapes of the face plate 2 and the substrate 6. Thus, when the face plate 2 is lowered and the substrate 6 raised with sufficient pressure to ensure uniform adhesion to the face plate and substrate 6 by the seal ring 4, a volume is formed bordered by the walls of the seal ring 4, the face plate 2, and the substrate 6.

In situations where the FEDs diameter is too long for the tensile strength of the glass face plate 2 and substrate 6 to be self supporting, then the seal ring includes a support member 51 which is of the same material as the seal ring 4.

Figure 4:
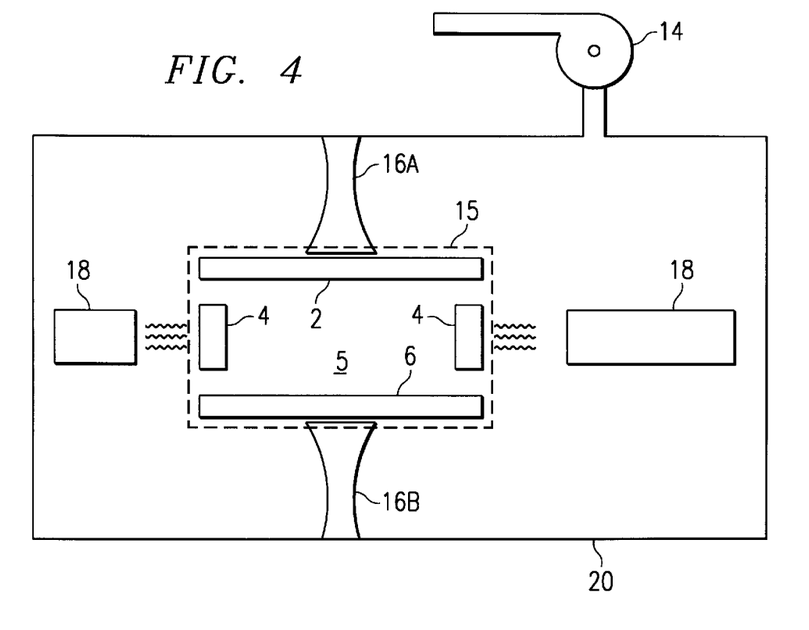
FIG. 4 illustrates a fabrication method for a field emission display according to an embodiment of the invention.

The method for fabricating the field emission display includes the steps for the FED assembly illustrated in FIG. 4. A vacuum must be created between the face plate and substrate that is sufficient enough to prevent Paschen breakdown in the space between the emitter tips and the cathodoluminescent screen, normally greater than $10^{-3}$ Torr. One way is to bake out the face plate and substrate at 400° C. degrees. By heating a volume to a high temperature and then sealing the volume, the air is removed in the space between the substrate and face plate. An alternate method is to pump the air out of a vacuum chamber 20 using a vacuum pump 14, as shown in FIG. 4.

Once a vacuum is formed using heat only, a vacuum pump, or both the seal ring 4 is placed and aligned between the face plate 2 and the substrate 6. Both the face plate 2 and substrate 6 are of glass or glasses that reach a viscosity of 100 poise at a temperature greater than the temperature at which seal ring 4 reaches 100 poise.

The apparatus for placing and aligning the components is discussed in greater detail below. Pressure plates 16A and 16B move face plate 2 and substrate 6 towards seal ring 4 and apply pressure to the assembly 15. Then, heating elements 18 heat seal ring 4 until the seal ring 4 reaches a melted state where the viscosity of the glass is around 100 poise. At a viscosity of around 100 poise seal ring 4 will began to flow and adhere to the face plate 2 and substrate 6. Then, the heat source is removed and the pressure plates are slightly moved apart to expand the volume between face plate 2 and substrate 6. After the assembled FED cools down, the FED is removed and the process can begin anew. It can be seen from FIGS. 8A–8B that the seal ring 4 thickness narrows (point 61) as a result of this process.

Both the face plate 2 and the substrate 6 have exposed glass areas for placement of the seal ring 4. This exposed area can be created during manufacturing by using masks or by etching techniques commonly used in semiconductor manufacturing processes, such as masking and chemically or plasma etching. In the embodiment shown the seal ring 4 is a box shaped glass seal, however, it also can be a ring shaped glass seal.

The manufacturing steps above may be performed manually using the vacuum box with manual manipulators for placement of the seal ring 4 in proper alignment with the face plate 2 and substrate 6. Alternately, the FED may be preassembled and placed in the vacuum box 20, in which case the volume 5 between the face plate 2 and substrate 6 must be heated to approximately 400° C. to effectively bake out the volume 5, substrate 6 and face plate 2.

FIG. 4 further illustrates how the method for manufacturing the field emission display may be implemented. In FIG. 4, the seal ring 4 is placed between the face plate and the substrate, which are all in a vacuum chamber 20. Also in the chamber is a heat source 18 shown in close proximity of the seal ring 4, a pressure plate 16A for moving the seal ring 4, and a pressure plate 16B for moving the substrate 6. It will be understood that positioning can be accomplished by robotics which are common in the semiconductor industry.

Figure 5:
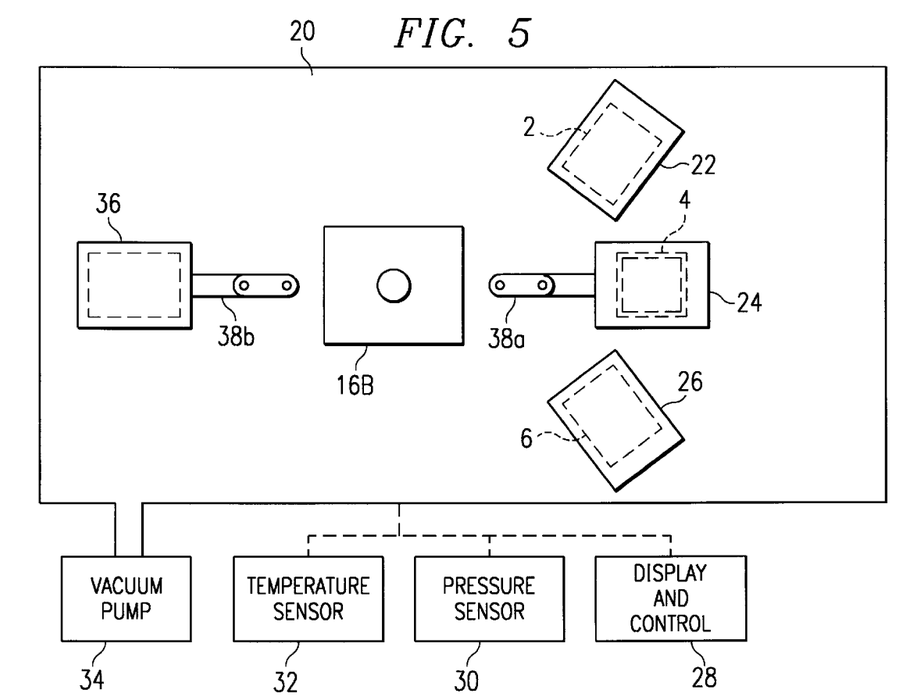
FIG. 5 illustrates a fabrication method for a field emission display according to an embodiment of the invention.
Figure 6A:
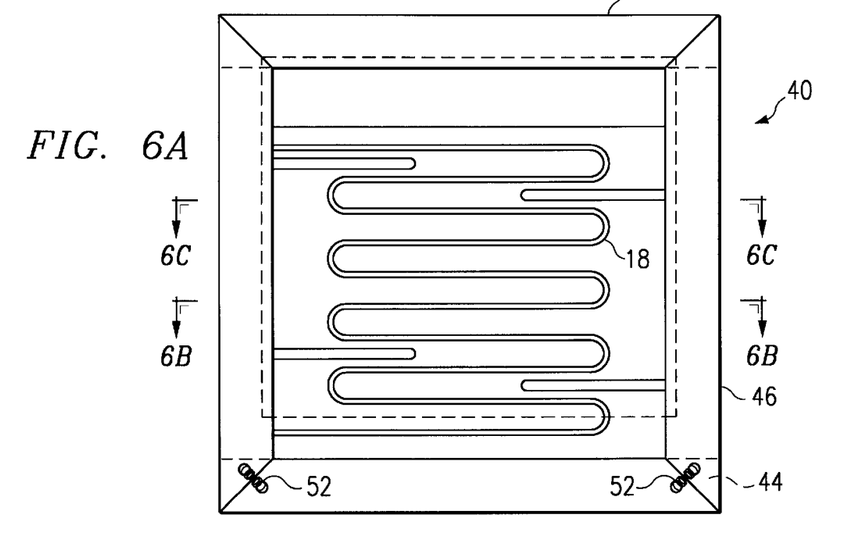
FIGS. 6a–d illustrate an apparatus for manufacturing FEDs.
Figure 6B:
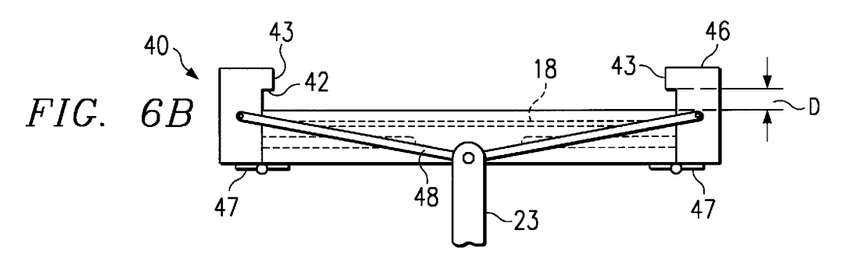
Figure 6C:
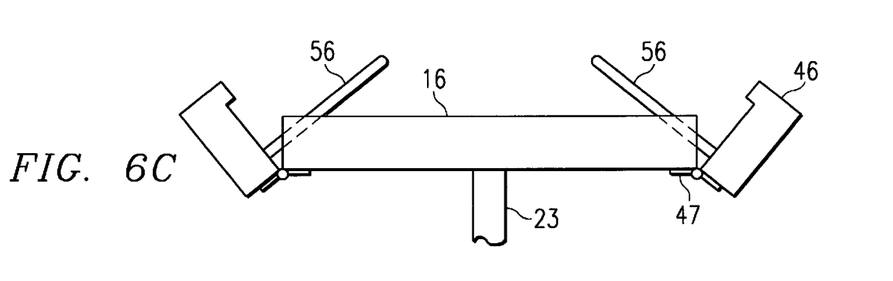
Figure 6D:
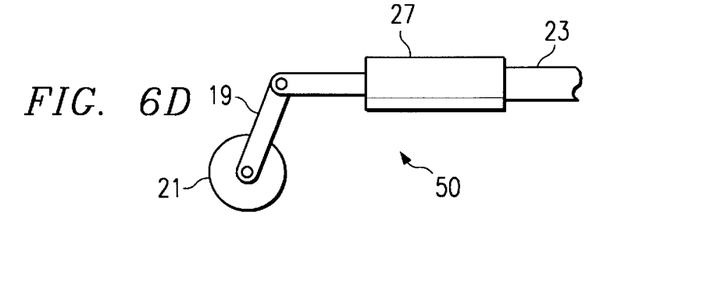

Another illustration, in the form of a block diagram, of an automatic apparatus for manufacturing the FEDs is provided in FIG. 5 in which there is a face plate cassette 36. The cassettes disclosed in FIG. 5 as well as the articulating arms are similar to those disclosed in U.S. Pat. No. 4,891,087 which is incorporated herein by reference. In FIG. 5 there is shown a vacuum chamber 20 that is evacuated by vacuum pump 34. There are top and bottom pressure plates 16A (not shown) and 16B respectively positioned to receive the top face plate 2, the substrate 6 and seal ring 4 (not shown). Also within the vacuum chamber 20 is a face plate cassette 22, a seal ring cassette 24 and a substrate cassette 26. A articulating arm 38A which is a device similar to that disclosed in U.S. Pat. No. 4,891,087 sequentially retrieves a substrate 6 from the substrate cassette 26 and places it on the pressure plate 16B, and retrieves a seal ring 4 from the seal ring cassette 24 and places it in alignment over the substrate 6. The pressure plate 16A lifts the seal ring of off the articulating arm 38a and places it on the previously positioned substrate 6. Finally the articulating arm 38a retrieves a face plate 2 from the face plate cassette 22 and places it in alignment with the seal ring 4. The pressure plates 16A and 16B are compressed by means of a motor drive system 50 of FIG. 6D that includes a stepper motor 21 and lever 19 that raises and lowers the pressure plates 16A and 16B, a solenoid 27 through which a shaft 23 passes controls the opening and closing of the side members 44 and end members 46 as shown in FIG. 6A. The motor drive system 50 is controlled by the control panel 28 that includes a microprocessor (not shown).

Each of the pressure plates 16A and 16B includes a heat source 18 (refer to FIG. 6A) for heating the both the substrate 2 and face plate 6. The seal ring 4 receives heat from the pressure plates 16A and 16B as well as heat source 18. Additionally, as shown in FIG. 6A each pressure plate has a retention assembly 40 for retaining the face plate 2, seal ring 4 and substrate 6. Temperature sensor 32 (FIG. 5) monitors the temperature of the chamber 20 and in particular the FED that is being assembled between the pressure plates 16A and 16B. Pressure sensor 30 monitor the pressure within the chamber 25. All of this data is connected to the control and display panel 28 to automatically control the manufacture of a cassette of FEDs.

Thus, when the proper temperature is achieved, the pressure plates 16A and 16B separate and a articulating arm 38B removes and stores in assembled cassette 36 a completed FED (not shown).

In FIGS. 6A–6D each pressure plate 16 includes a retainer assembly 40 that has a retaining lip 42 that retains the plate (either face plate 2 or substrate 6) and seal ring 4 in proper alignment. Levers 48 operate in combination with the motor drive system 50 and hinges 47 to lower and separate the side members 46 and end members 44. As the side members 46 separate, springs 52 that are connected between the side members 46 and end members 44 cause the end members 44 to also separate.

Pins 56 are used to lift the glass plate (either face plate 2 or substrate 6) from the articulating arm 38a following its positioning over pressure plate 16B. The pins 56 are retracted as the side members 46 and end members 44 close through the operation of the motor drive system 50.

The seal ring 4 is lifted from the articulating arm 38a following its positioning over the pressure plate 16B by the pressure plate 16A closing the side members and end members around the seal ring 4 and gripping it with lips 43. After it is positioned onto the glass plate resting on the pressure plate 16B the side members 46 and end members 44 retract to release the seal ring. The articulating arm 38a then retrieves the glass plate that is to be held by the pressure plate 16A and positions it over the previously placed seal ring 4. The pressure plate 16A is the lowered and the side members 46 and end members 44 open and grip the previously positioned glass plate by retaining ledges 42.

Figure 7:
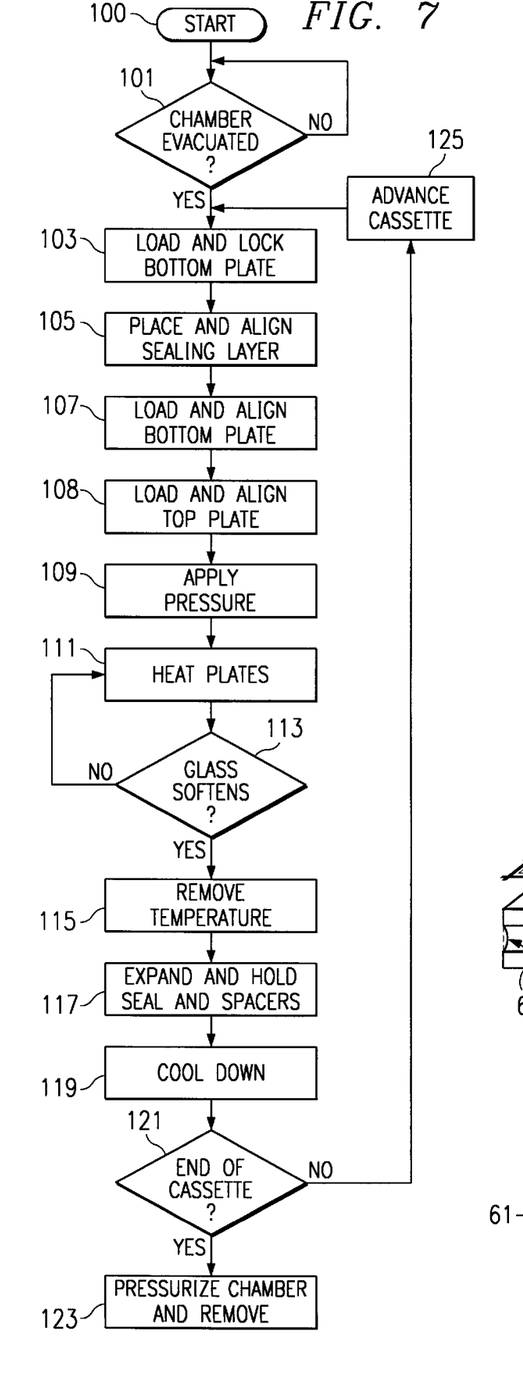
FIG. 7 shows a manufacturing flow chart for the apparatus of in FIG. 6.

The execution of the automatic manufacture of an FED in the system of FIGS. 5 and 6 is controlled by a microprocessor (not shown) contained within the control and display panel 28 which is programmed to execute the steps of FIG. 7. These steps include the following: initialization 100 and, evacuating 101 a chamber containing the elements of the FED to be assembled. Once a the chamber has been evacuated (101) to a point sufficient to prevent Paschen breakdown in the space between the emitter tips and the cathodoluminescent screen of an assembled device, a bottom plate is locked and loaded for processing 103. The bottom plate can either be the face plate 2 or the substrate 6. However in the event that spacers are included, then it is preferable that the substrate be the substrate 6. The seal ring 4 can be constructed from glass or any material which can be melted and which will adhere to face plates and substrates. The seal ring 4 material must be able to maintain its adherence to the face plate and the substrate while being stretched.

After the bottom plate 107, seal ring, and top plate 108 have been aligned 105–108, they are positioned together and pressure is applied 109. The pressure should be sufficient to assure a uniform seal around the face plate and the substrate. Then, heat is applied 111 to the plates until the sealing layer softens 113. In this example, when the viscosity of the sealing layer reaches around 100 poise, the source of temperature can be removed 115 and the space between the sealing layers and spacers is expanded 117. When the assembly has cooled 119, the cassette is advanced 125, if it is not the end of the cassette. If it is the end of the cassette 121, the chamber is returned to atmospheric pressure which allows the cassette to be replaced 123.

The step of heating the seal ring 4 may be accomplished by energizing heating coils in close proximity of the sealing layer. Ni-chrome heating coils may provide sufficient heat to melt the sealing layer. Radio frequency or infrared heating techniques may also be used to heat the sealing layer.

The arranging and pulling of the face plate 2, seal ring 4,k and substrate 6 may be accomplished by using robotics apparatus which is common in the semiconductor industry. The robotics apparatus can be programmed to place the sealing layer close to the heating coils and between the face plate and the substrate. Additionally, the robotics apparatus can sense when the sealing layer is beginning to flow and then pull the face plate away from the substrate. By pulling the face plate away from the substrate, the created volume is increased proportional to the distance which it is pulled apart. If the distance between the face plate and the substrate is doubled, than the volume is approximately doubled, for example. Therefore, the vacuum is doubled since no additional air can enter.

Figure 8A:
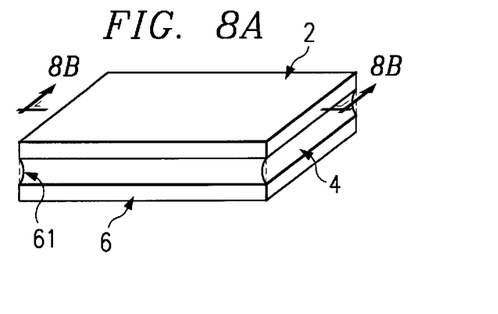
Figure 8B:
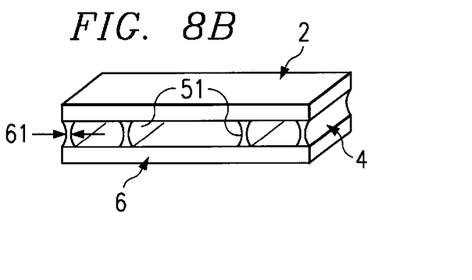
Figure 10A:
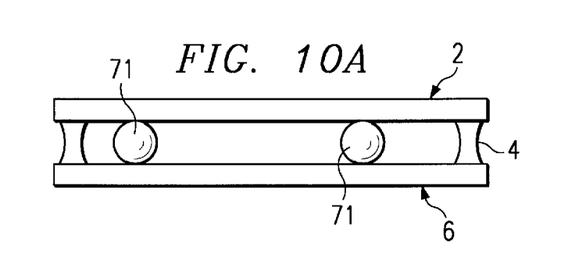
FIG. 10 shows the different embodiments of spacers according to the invention.
Figure 10B:
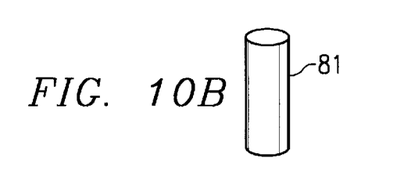

FIG. 8A shows a perspective view of an FED, and FIG. 8C shows a perspective view of the FED of FIG. 8A taken at 8B–8B. From this cross section, the seal ring 4 and the spacers 51 are visible. The spacers 51 may be spherical shaped 71 (FIG. 10A) or cylindrical 81 (FIG. 10B) as described in PCT WO 94/15244 application, which is incorporated herein by reference.

Figure 9:
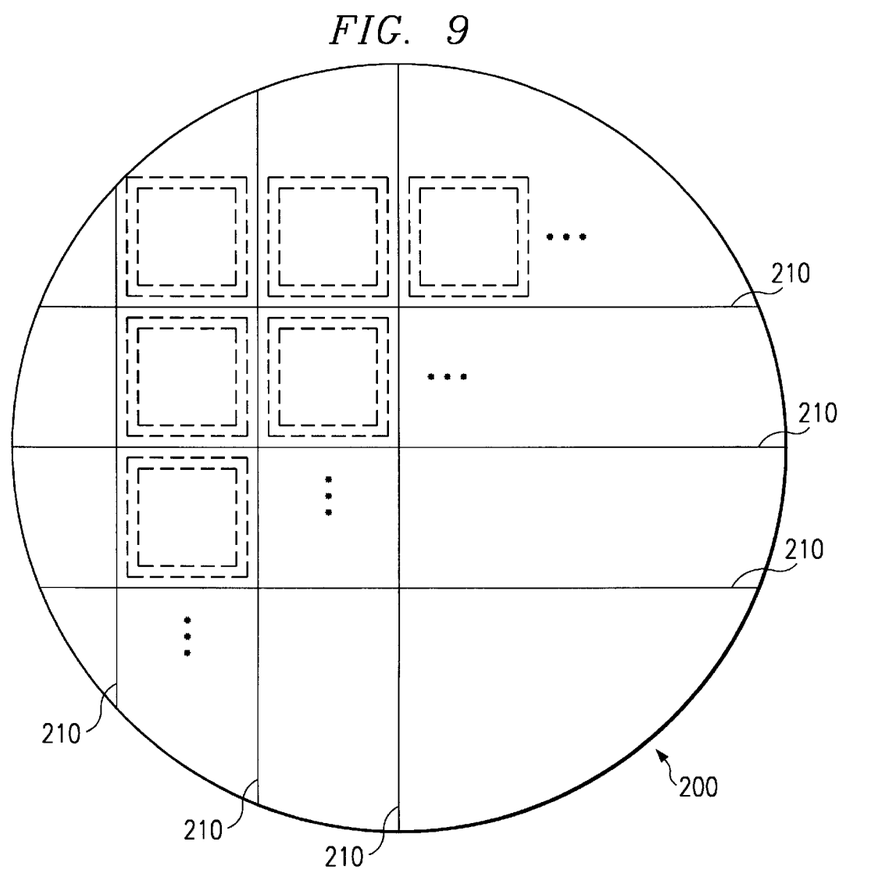
FIG. 9 shows a wafer assembly of FEDs constructed in accordance with the disclosed invention.

FIG. 9 shows a wafer 200 having a plurality of FED assemblies shown in dotted outline form. The sealing rings can be placed between a substrate wafer and a face plate wafer such that the alignment is done on a wafer by wafer basis. The wafer 200 has scribe lines 210 which is where the wafers would be cut to make finished assemblies. The apparatus of FIGS. 5–7 may be used with size adjustments and using circular pressure plates to manufacture a complete wafer 200 of FEDs.

By using this fabrication method for attaching a face plate to a substrate of a field emission display, a high vacuum is created. Additionally, the invention provides a method for fabricating a field emission display which has increased vacuum compared to the vacuum of the vacuum chamber which it is assembled and is thus an improved fabrication method for field emission displays.

We claim:

1. A method for fabricating a field emission display containing at least one electron emitter site comprising the steps of:

arranging a sealing layer between a face plate and a substrate to encase said at least one electron emitter site, heating the sealing layer by heating a wire in close proximity to the sealing layer until the sealing layer adheres to the face plate and the substrate to create an enclosed volume, and slightly increasing the volume between the face plate and the substrate by applying a separating force between the face plate and substrate.

2. The method of claim 1 wherein the step of arranging a sealing layer between a face plate and a substrate is performed in a vacuum chamber.

3. The method of claim 1 wherein said step of arranging a sealing layer between a face plate and a substrate is performed robotically.

4. The method of claim 1 wherein the sealing layer comprises a glass material.

5. The method of claim 4 wherein the glass material is heated to 400° C.

6. The method of claim 4 wherein the glass material is heated until its viscosity reaches about 100 poise.

7. A method for fabricating a field emission display containing at least one electron emitter site comprising the steps of:

placing a face plate, a sealing layer, and a substrate in a vacuum chamber;

evacuating the vacuum chamber;

arranging the sealing layer between the face plate and the substrate to encase said at least one electron emitter site, heating the sealing layer by heating a wire in close proximity to the sealing layer until the sealing layer adheres to the face plate and the substrate to create an enclosed volume, and pulling the face plate and the substrate apart such that the enclosed volume is increased.

8. The method of claim 7 wherein said step of arranging a sealing layer between a face plate and a substrate is performed robotically.

9. The method of claim 7 wherein the sealing layer comprises an amorphous material.

10. The method of claim 9 wherein the amorphous material is glass.

11. The method of claim 10 wherein the glass material is heated until its viscosity reaches about 100 poise.

12. A method for fabricating a field emission display containing at least one electron emitter site comprising the steps of:

evacuating a chamber;

loading a bottom plate on a first pressure plate within the chamber;

aligning a glass sealing layer on the bottom plate;

loading a top plate on a second pressure plate to encase said at least one electron emitter site;

applying pressure so that the sealing layer is squeezed between the first pressure plate and the second pressure plate;

heating at least the sealing layer by heating a wire in close proximity to the sealing layer until the glass softens, whereby a seal is created between the sealing layer and said top and bottom plates to create a sealed chamber therebetween;

expanding the space between the first pressure plate and the second pressure plate; and allowing at least the sealing layer to cool.

13. The method of claim 12 wherein the steps of aligning a sealing layer on the bottom plate and loading a top plate are performed in a vacuum chamber.

14. The method of claim 12 wherein the steps of loading a bottom plate, loading a top plate, and aligning sealing layer is performed robotically.

15. The method of claim 12 wherein the sealing layer comprises an amorphous material.

16. The method of claim 15 wherein the amorphous material is glass.

17. The method of claim 16 wherein the glass material is heated until its viscosity reaches about 100 poise.

18. A method for fabricating a field emission display containing at least one electron emitter site comprising the steps of:

arranging a sealing layer between a face plate and a substrate to encase said at least one electron emitter site, heating the sealing layer by a radio frequency heating technique until the sealing layer adheres to the face plate and the substrate to create an enclosed volume, and slightly increasing the volume between the face plate and the substrate by applying a separating force between the face plate and substrate.

19. The method of claim 18 wherein the step of arranging a sealing layer between a face plate and a substrate is performed in a vacuum chamber.

20. The method of claim 18 wherein said step of arranging a sealing layer between a face plate and a substrate is performed robotically.

21. The method of claim 18 wherein the sealing layer comprises a glass material.

22. The method of claim 21 wherein the glass material is heated to 400° C.

23. The method of claim 21 wherein the glass material is heated until its viscosity reaches about 100 poise.

24. A method for fabricating a field emission display containing at least one electron emitter site, a method comprising the steps of:

arranging a sealing layer between a face plate and a substrate to encase said at least one electron emitter site, heating the sealing layer by an infrared heating technique until the sealing layer adheres to the face plate and the substrate to create an enclosed volume, and slightly increasing the volume between the face plate and the substrate by applying a separating force between the face plate and substrate.

25. The method of claim 24 wherein the step of arranging a sealing layer between a face plate and a substrate is performed in a vacuum chamber.

26. The method of claim 24 wherein said step of arranging a sealing layer between a face plate and a substrate is performed robotically.

27. The method of claim 24 wherein the sealing layer comprises a glass material.

28. The method of claim 27 wherein the glass material is heated to 400° C.

29. The method of claim 27 wherein the glass material is heated until its viscosity reaches about 100 poise.

* * * * *